(12) United States Patent
Bush

(10) Patent No.: US 8,271,879 B2
(45) Date of Patent: Sep. 18, 2012

(54) WORKSTATION MANAGEMENT APPLICATION

(75) Inventor: Thomas Shane Bush, Calera, AL (US)

(73) Assignee: Southern Company Services, Inc., Atlanta, GA (US)

( * ) Notice: Subject to any disclaimer, the term of this patent is extended or adjusted under 35 U.S.C. 154(b) by 297 days.

(21) Appl. No.: 12/837,700

(22) Filed: Jul. 16, 2010

(65) Prior Publication Data

US 2012/0017157 A1 Jan. 19, 2012

(51) Int. Cl.
*G06F 15/177* (2006.01)
(52) U.S. Cl. ......................................... 715/736
(58) Field of Classification Search ................... 715/736
See application file for complete search history.

(56) References Cited

U.S. PATENT DOCUMENTS

| | | | | |
|---|---|---|---|---|
| 6,157,378 A | * | 12/2000 | Bormann et al. | 715/733 |
| 7,155,514 B1 | * | 12/2006 | Milford | 709/225 |
| 2004/0229201 A1 | * | 11/2004 | Korkko et al. | 434/350 |
| 2007/0136683 A1 | * | 6/2007 | Heidari et al. | 715/792 |
| 2009/0150789 A1 | * | 6/2009 | Regnier | 715/736 |
| 2010/0024015 A1 | * | 1/2010 | Hardt | 726/6 |

* cited by examiner

*Primary Examiner* — Boris Pesin
*Assistant Examiner* — Angie Badawi
(74) *Attorney, Agent, or Firm* — Thomas, Kayden, Horstemeyer & Risley, LLP

(57) ABSTRACT

Disclosed are various embodiments for a workstation management application. An identification of a user is obtained in a user interface. A listing of workstations that the user has accessed is rendered in the user interface. A selection of one of the workstations is obtained in the user interface. A listing of management tasks configured for the workstation is rendered in the user interface. One of a plurality of management tools is launched to perform a selected one of the management tasks for the workstation.

21 Claims, 10 Drawing Sheets

WORKSTATION MANAGEMENT APPLICATION

BACKGROUND

A large organization may have numerous users and workstations on a computer network. While some users may have a dedicated workstation and only use that workstation, other users may use multiple workstations at least sometimes. For auditing, problem solving, and other reasons, it may be desirable for information technology support personnel to know which workstation a user has logged into and when. It may be difficult for users having limited knowledge of information technology architecture to identify their workstations to the support personnel. The support personnel may have to guide a user through a procedure in order to discover which workstation the user is currently using. Such a procedure may be confusing and/or inconvenient for the user. Alternatively, the support personnel may have to scour log files manually, which may be difficult and time consuming. Further, the users may not be able to identify workstations that they have previously used, which may lead support personnel to examine log files.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to a workstation management application that may be used to manage network-connected workstations in an environment of many workstations and many users. The workstation management application provides a simplified interface for ascertaining which workstations a user was logged into and when. In addition, the workstation management application enables information technology support personnel to perform a variety of workstation management functions through the same interface. The workstation management application may reduce or eliminate retyping information such as usernames or workstation names into multiple forms or applications. Further, the workstation management application may be configured to use a "lazy-loading" information retrieval strategy, wherein information may be selected before it is actually loaded. In the following discussion, a general description of the system and its components is provided, followed by a discussion of the operation of the same.

Figure 1:
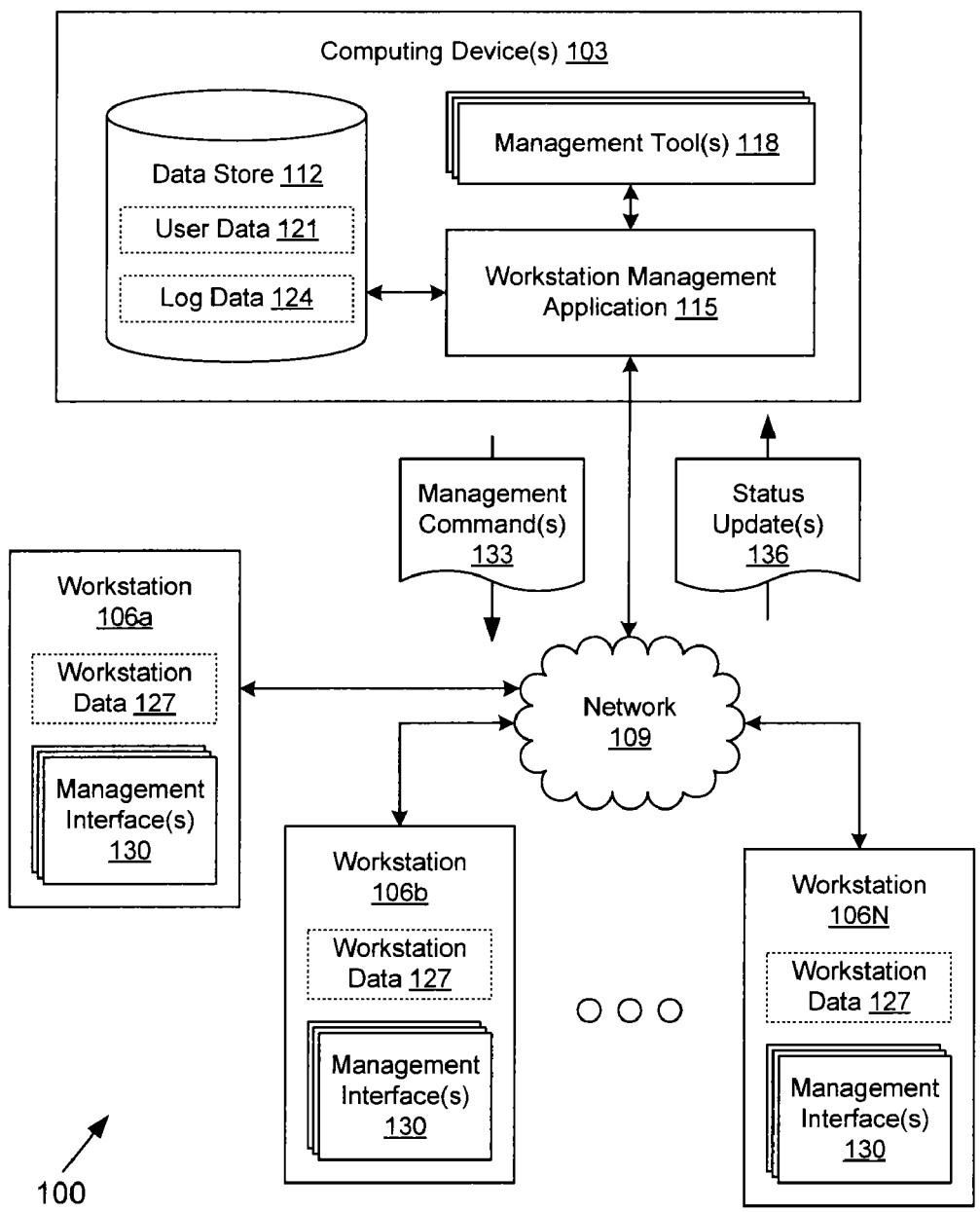
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with a plurality of workstations 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer, a client computer, or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may comprise a networked file share, a directory on a hard drive or other storage medium of the computing device 103, a relational database, a flat-file database, or any other mechanism for storing data. The data store 112 may be representative of a plurality of data stores 112 as can be appreciated. The data stored in the data store 112, for example, is associated with the operation of the various applications and/or functional entities described below.

The components executed on the computing device 103, for example, include a workstation management application 115, one or more management tools 118, and other applications, services, processes, systems, engines, or functionality not discussed in detail herein. The workstation management application 115 is executed to provide an interface for information technology support personnel or other management users to look up workstations 106 associated with a given identification of a user and to perform management functions on those workstations 106. The workstation management application 115 may also be executed to provide a management interface for a workstation 106 given an identification of the workstation 106.

In various embodiments, the workstation management application 115 may comprise a thin client, a thick client, a standalone application, a networked application, a network page interface application, and so on. Where the workstation management application 115 comprises a network page interface application, the workstation management application 115 may incorporate a browser application. Examples of commercially available browser applications include Mozilla® Firefox®, Microsoft® Internet Explorer®, Apple® Safari®, etc. To this end, the workstation management application 115 may include one or more network pages, such as web pages, that may include various client-side code in languages such as, for example, Javascript, JScript, VBScript, C#, and so on. In one embodiment, the browser application may download the various network pages from a network page server accessible within the network 109. In another embodiment, the browser application may access locally stored network pages and associated data.

The management tools 118 correspond to any of various applications or tools that may be configured to manage workstations 106. As non-limiting examples, a management tool 118 may correspond to a utility for browsing a file system of a workstation 106, a tool for managing tasks on a workstation 106 remotely, a tool for editing a system registry of a workstation 106 remotely, a tool for offering assistance remotely, a tool for accessing a console or command prompt of a workstation 106, a tool for viewing and/or interacting with a screen of the workstation 106 remotely, and/or other tools for managing workstations 106. Such management tools 118 may comprise third-party tools such as remote desktop software, Virtual Network Computing (VNC), Microsoft® Systems Management Server Remote Tools, and/or other tools. In addition, the management tools 118 may include network management, performance measurement, and diagnosis applications such as ping, traceroute, Simple Network Management Protocol (SNMP) applications, and other applications.

The data stored in the data store 112 includes, for example, user data 121, log data 124, and potentially other data. The user data 121 may include any information related to users of workstations 106, such as, for example, username, real name, job title, business unit, building, location, supervisor, workgroup, domain, dedicated workstations 106, email address, unique identifier, and/or other information. In one embodiment, the user data 121 may be obtained through a directory server, such as, for example, a Lightweight Directory Access Protocol (LDAP) server, an Active Directory server, or another type of directory server.

The log data 124 may include data relating to logon events associated with users and workstations 106. For example, the log data 124 may specify when a user has logged into a particular workstation 106 and/or when a user has logged out from a particular workstation 106. The log data 124 may be indexed by username, workstation name, and/or other data fields in various embodiments. In one embodiment, the log data 124 comprises a plurality of log files, where each of the files contains logon events associated with a corresponding user account. In one embodiment, each of the workstations 106 may have access to insert new logon events within the log data 124 as the logon events are generated. In another embodiment, a server that handles authentication or another server may have access to insert new logon events within the log data 124.

The workstations 106a, 106b . . . 106N are representative of a plurality of client devices that may be coupled to the network 109. Each workstation 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability. Each workstation 106 may include corresponding workstation data 127, one or more management interfaces 130, and other applications and data as appropriate.

The management tools 118 and/or the workstation management application 115 may be configured to send management commands 133 over the network 109. The management commands 133 may include any type of data used in managing the workstations 106. In response, status updates 136 may be generated by the workstations 106 and returned to the management tools 118 and/or the workstation management application 115.

Next, a general description of the operation of the various components of the networked environment 100 is provided. To begin, each time a user logs into a workstation 106, a logon event is generated and stored within the log data 124. Likewise, each time a user logs out from a workstation 106, another logon event may be generated and stored within the log data 124. A management user may access the workstation management application 115 on the computing device 103 and initiate a management session. A management session employing the workstation management application 115 will be described in the following paragraphs with reference to the networked environment of FIG. 1 and the example user interfaces depicted in FIGS. 2-8.

Figure 2:
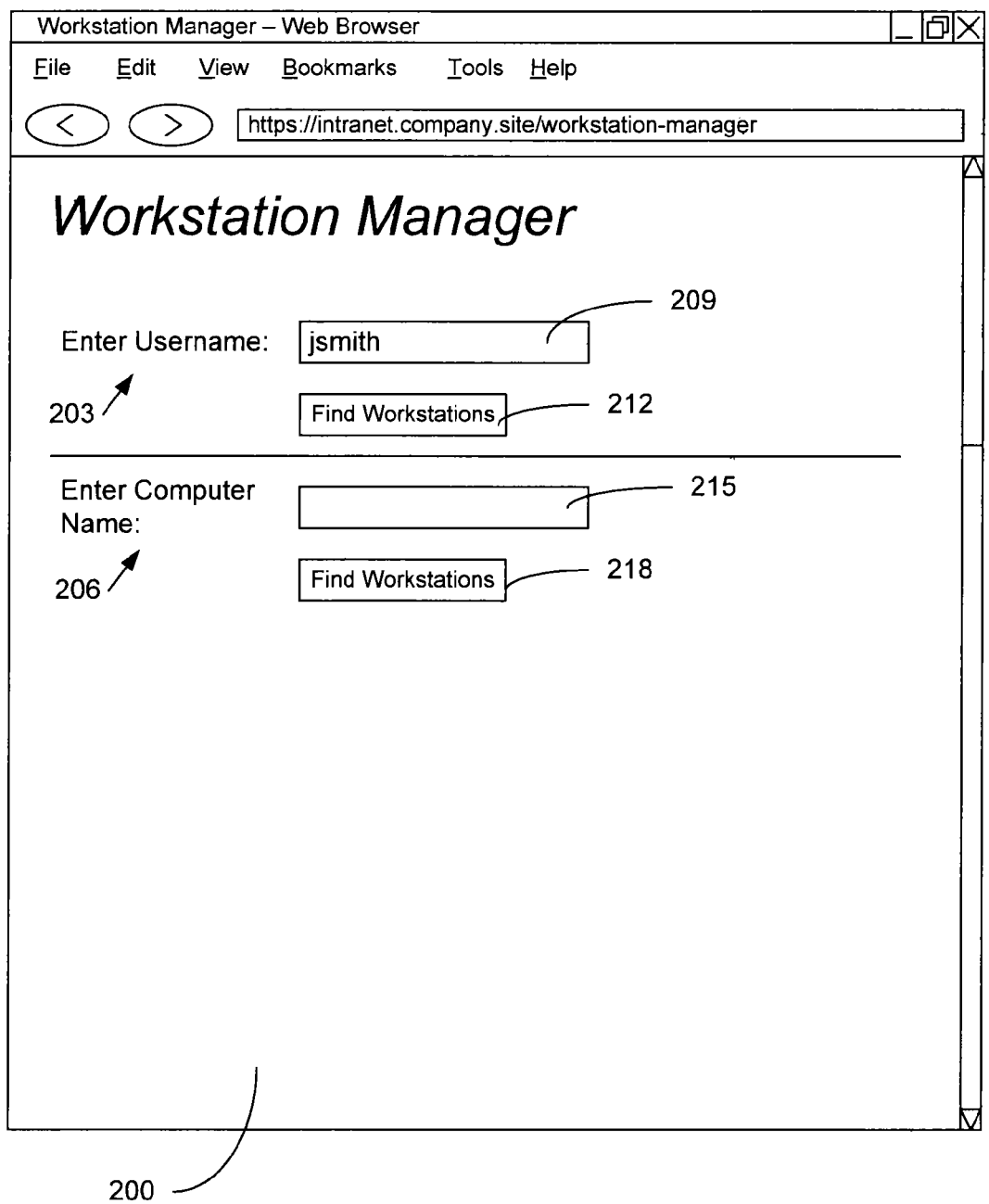
FIGS. 2-8 are drawings of examples of user interfaces rendered by a workstation management application executed in a computing device in the networked environment of FIG. 1 according to various embodiments of the present disclosure.

Turning now to FIG. 2, shown is one example of a user interface 200 rendered in the computing device 103 of the networked environment 100. The user interface 200 depicts an initial screen of the workstation management application 115. The user interface 200 is shown as a network page rendered in a browser application but may comprise any type of user interface in other embodiments. The user interface 200 may include, for example, a username entry form 203, and a workstation name entry form 206, and/or other components.

The username entry form 203 may include a username entry field 209, a submit component 212, and/or other components. Although the username entry field 209 is depicted as a text input field, the username entry field 209 may comprise a drop-down box, slider, checkboxes, radio buttons, and/or other user interface components in other embodiments. When a management user would like to find workstation information for a user, the management user may simply enter the username, the last name of the user, a unique identifier associated with the user, or other identification corresponding to the user in the username entry field 209 and then select the submit component 212.

The workstation name entry form 206 may include a workstation name entry field 215, a submit component 218, and/or other components. Although the workstation name entry field 215 is depicted as a text input field, the workstation name entry field 209 may comprise a drop-down box, slider, checkboxes, radio buttons, and/or other user interface components in other embodiments. When a management user would like to find workstations to manage, the management user may simply provide a computer name, Domain Name Service (DNS) name, host name, Internet Protocol (IP) address, Media Access Control (MAC) address, and/or other identification corresponding to the workstation 106 in the workstation name entry field 215 and then select the submit component 218.

Although the workstation name entry form 206 is depicted as below the username entry form 203 in the user interface 200, it is understood that the workstation name entry form 206 and the username entry form 203 may be presented at any position in the user interface 200. In other embodiments, the workstation name entry form 206 may be optional and may be presented in a different screen or user interface 200 from the username entry form 203.

Figure 3:
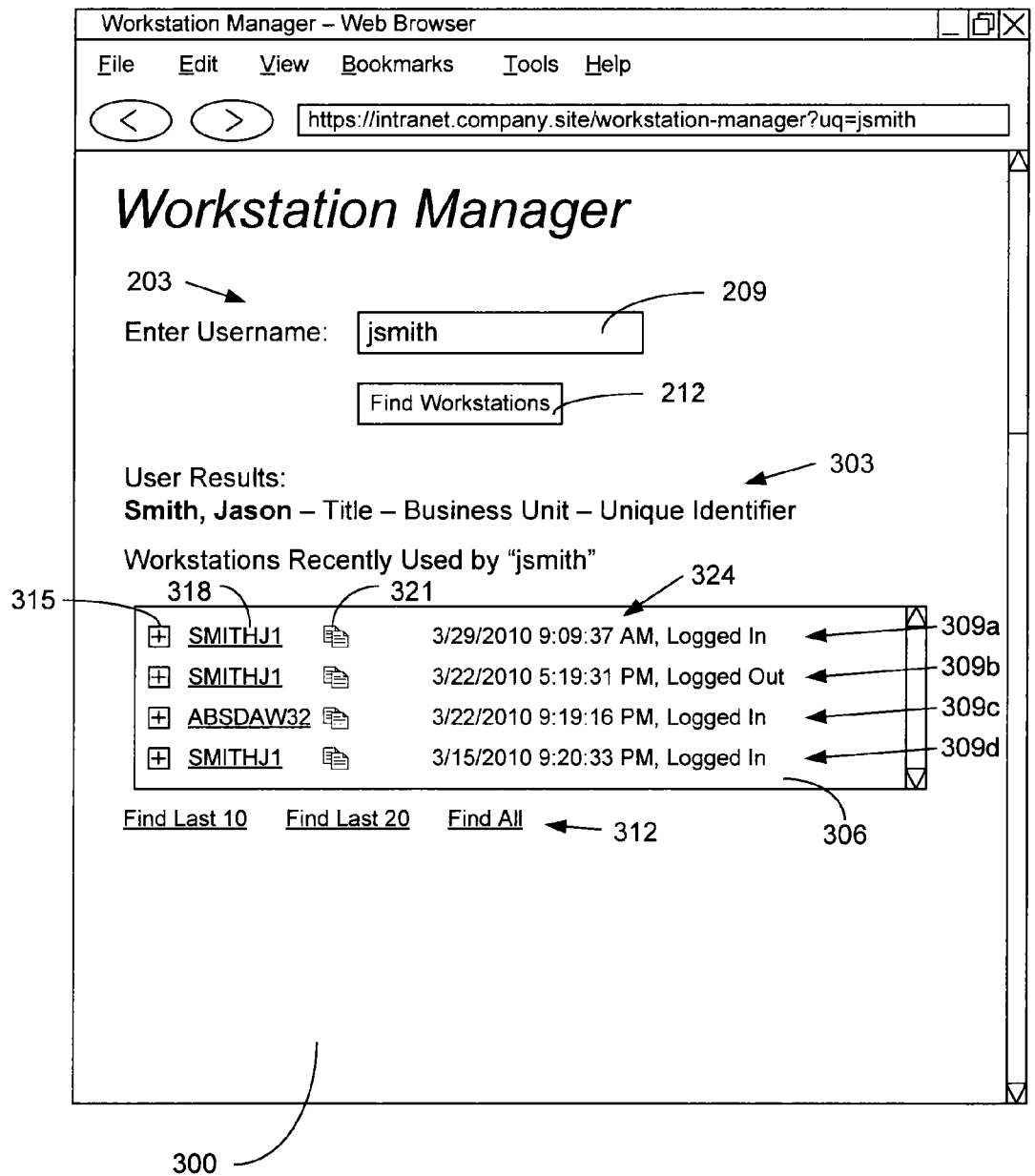

Referring next to FIG. 3, shown is another example of a user interface 300 rendered in the computing device 103 of the networked environment 100. The user interface 300 depicts a user management screen of the workstation management application 115. The user interface 300 is shown as a network page rendered in a browser application but may comprise any type of user interface in other embodiments. In the user interface 300, the username of "jsmith" has been entered in the username entry field 209 and the submit component 212 has been selected.

Accordingly, the workstation management application 115 has searched the user data 121 and rendered information about the user "jsmith." The user information 303 may include a full name of the user, title, business unit, unique identifier, and/or other information that may be helpful to management users or other information technology support personnel. The workstation management application 115 has also searched the log data 124 for logon events associated with the given user "jsmith." The workstation management application 115 has rendered a workstation listing 306 for displaying this information. The workstation listing 306 may comprise a viewport, a text area, a grid, a spreadsheet, a list of links, a frame, an internal frame, and/or any other type of display region within a user interface 300 that is suitable for displaying a listing of information regarding workstations 106 that a user has used.

The workstation listing 306 may include one or more workstation entries 309. In the example of FIG. 3, four workstation entries 309a, 309b, 309c, and 309d are illustrated. Although four workstation entries 309 are illustrated in FIG. 3, it is understood that the workstation listing 306 may be configured to display any number of workstation entries 309. For example, scroll bars may be provided to enable additional workstation entries 309 to be provided within the workstation listing 306 beyond those which are initially visible in the user interface 300. In one embodiment, the workstation listing 306 comprises a listing of a proper subset of the workstations 106 that the user has accessed.

Workstation listing controls 312 may be provided to select a number of workstation entries 309 to be displayed within the workstation listing 306. In the non-limiting example of FIG. 3, workstation listing controls 312 include a link for displaying the last ten workstation entries 309, a link for displaying the last twenty workstation entries 309, and a link for displaying all of the workstation entries 309. It is understood that other user interface components may be used for the workstation listing controls 312 as can be appreciated.

Figure 4:
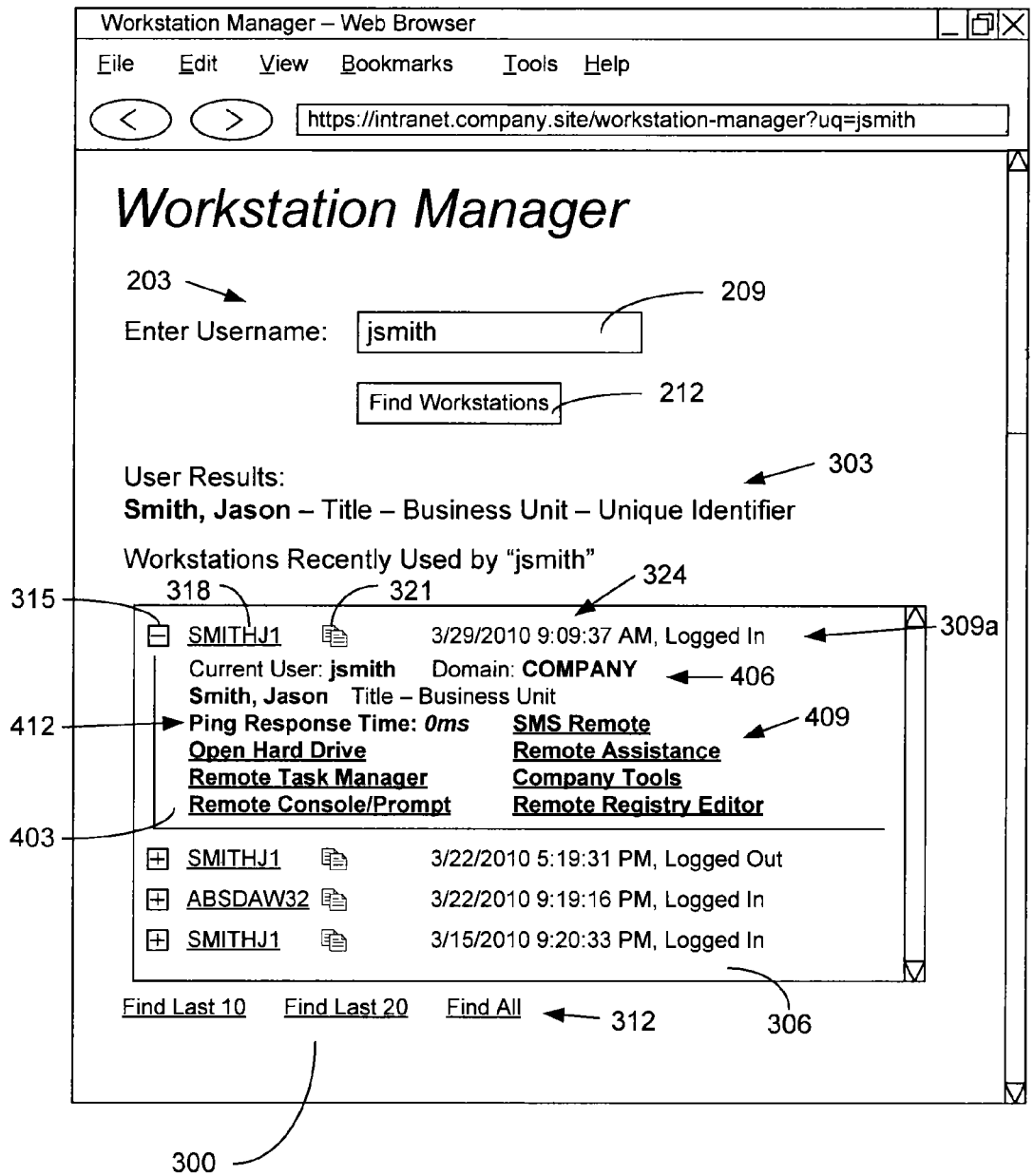

Each workstation entry 309 may include, for example, an expand component 315, a workstation name 318, a copy component 321, logon event information 324, and/or other information or components. The expand component 315, when selected, may trigger the rendering of additional information in the user interface 300, for example, within an elastic display region between the respective workstation entry 309 and an adjacent workstation entry 309. Such an elastic display region is depicted in FIG. 4 and may correspond to a tree user interface component for navigation. The workstation name 318 may comprise a link, button, or other user interface component for selecting the identified workstation 106 for displaying additional information and/or performing management tasks. The copy component 321 may comprise a link, button, or other user interface component for copying information about the workstation 106 or the user to a system clipboard of the computing device 103.

The logon event information 324 may include specific information related to a logon event recorded in the log data 124 such as, for example, a time associated with the logon event, a duration associated with the logon event, whether errors in security credentials (e.g., mistyped passwords) occurred, whether a user logged in or logged out, and so on. In FIG. 4, the workstation entries 309 are ordered within the workstation listing 306 according to a time in the logon event information 324. In other embodiments, the workstation entries 309 may be randomly ordered or ordered according to other criteria. For example, the workstation entries 309 may be ordered alphabetically by the workstation names 318. In another embodiment, the workstation entries 309 may be collated according to workstation 106 and configured to provide information related to multiple logon events within a single workstation entry 309 corresponding to a workstation 106.

Moving on to FIG. 4, shown is another illustration of the user interface 300 of FIG. 3 rendered in the computing device 103 of the networked environment 100. In FIG. 4, the expand component 315 of the workstation entry 309a has been selected, thereby expanding the additional information region 403. The additional information region 403, which may be an elastic display region, a pop-up window, a pop-over window, or other type of display region, may be used to display various information regarding the workstation 106 that corresponds to the workstation entry 309a. It is noted that multiple workstation entries 309 may be expanded concurrently by selecting their corresponding expand components 315.

The additional information region 403 may include current user information 406, management tool selection components 409, diagnostics information 412, and/or other information or components. The additional information region 403 and other user interface components of the workstation management application 115 may be configured to support "lazy loading," so that a management user is able to select a piece of information for display before actually loading it. The current user information 406 may include various information related to the current logged on user of the corresponding workstation 106. Such information may include, for example, a username, a real name, a domain, a workgroup, a title, a business unit, a unique identifier, and so on.

Management tool selection components 409, such as, for example, buttons, links, and/or other user interface components, may be provided for selecting a management tool 118 to be used in managing the workstation 106. The management tool selection components 409 illustrated in FIG. 4 comprise links labeled "Open Hard Drive," "Remote Task Manager," "Remote Console/Prompt," "SMS Remote," "Remote Assistance," "Company Tools," and "Remote Registry Editor." The management tool selection components 409 illustrated in FIG. 4 are merely examples to demonstrate possible management tool selection components 409. As a non-limiting example, each management tool selection component 409 may correspond to a distinct management tool 118 or a distinct function provided by the management tools 118.

In some embodiments, a corresponding management interface 130 such as a service application may be executed on the workstations 106 for one or more of the management tools 118. The management interface 130 may receive management commands 133 generated through the management tools 118, may perform the management function, and may return the result of the management function by way of the status updates 136. In some embodiments, one or more management tools 118 may be modified from their commercially available versions for interoperability with the workstation management application 115.

The diagnostics information 412 may be configured to display workstation performance, network performance, and/or other performance measurement or diagnostics information related to the workstation 106. In the example of FIG. 4, a "Ping Response Time" of "0ms" is shown. Other diagnostics information 412 may be provided, such as traceroute information, DNS status information, SNMP information, and so on as can be appreciated. In one embodiment, the underlying diagnostics are executed by the workstation management application 115 when the user interface 300 is loaded. In another embodiment, the underlying diagnostics are executed by the workstation management application 115 when the expand component 315 is selected. In still another embodiment, the underlying diagnostics are executed by the workstation management application 115 on a regular interval and the last results are reported. In other embodiments, the execution of the underlying diagnostics may be performed by other applications executing in other computing devices 103. The other applications may then make the diagnostics data available to the workstation management application 115 by a push or pull configuration as desired.

Figure 5:
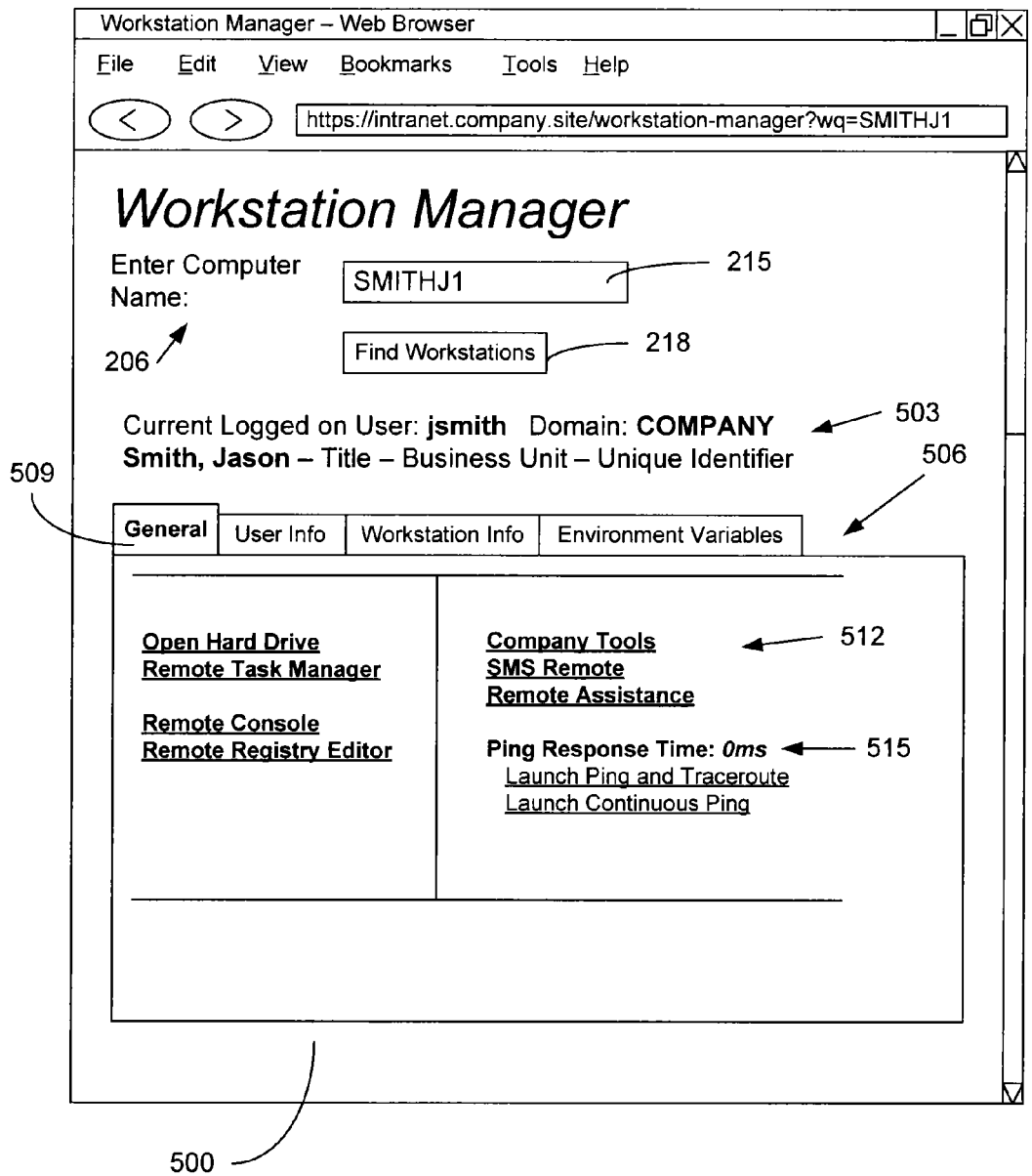

With reference to FIG. 5, shown is another example of a user interface 500 rendered in the computing device 103 of the networked environment 100. The user interface 500 depicts a workstation management screen of the workstation management application 115. The user interface 500 is shown as a network page rendered in a browser application but may comprise any type of user interface in other embodiments. In the user interface 500, the workstation name of "SMITHJ1" has been entered in the workstation name entry field 215, and the submit component 218 has been selected. The user interface 500 includes current user information 503, a workstation management region 506, and/or other information and/or components. In some embodiments, the user interface 500 may be displayed adjacent to, and may interoperate with, the user interface 300 of FIGS. 3 and 4. For example, selecting a workstation name 318 in the user interface 300 may cause the user interface 500 to be activated for the workstation 106 corresponding to the workstation name 318. The user interface 500 may include more detailed information about a workstation 106 than available, for example, in the additional information region 403 of FIG. 4.

The current user information 503 may include similar information to the current user information 406 in FIG. 4. The current user information 503 may include various information related to the current logged on user of the corresponding workstation 106. Such information may include, for example, a username, a real name, a domain, a workgroup, a title, a business unit, a unique identifier, and so on.

The workstation management region 506 may include a plurality of subregions or groupings directed toward managing particular aspects of a workstation 106. In the example of FIG. 5, the workstation management region 506 is depicted as a collection of tabs, where one tab is activated or selected. The tabs may include, for example, "General," "User Info," "Workstation Info," "Environment Variables," and/or other tabs. The activated tab in FIG. 5 is the general region 509. The contents of the general tab 509 may include, for example, management tool selection components 512 and diagnostics information 515, which may correspond, respectively, to the management tool selection components 409 and the diagnostics information 412 of the additional information region 403. In some embodiments, the management tool selection components 512 and the diagnostics information 515 may include additional or different components or information in comparison to the management tool selection components 409 and the diagnostics information 412 shown in FIG. 4. For example, as illustrated in FIG. 5, the diagnostics information 515 includes components for launching diagnostic tools, such as ping, traceroute, and a continuous ping.

Figure 6:
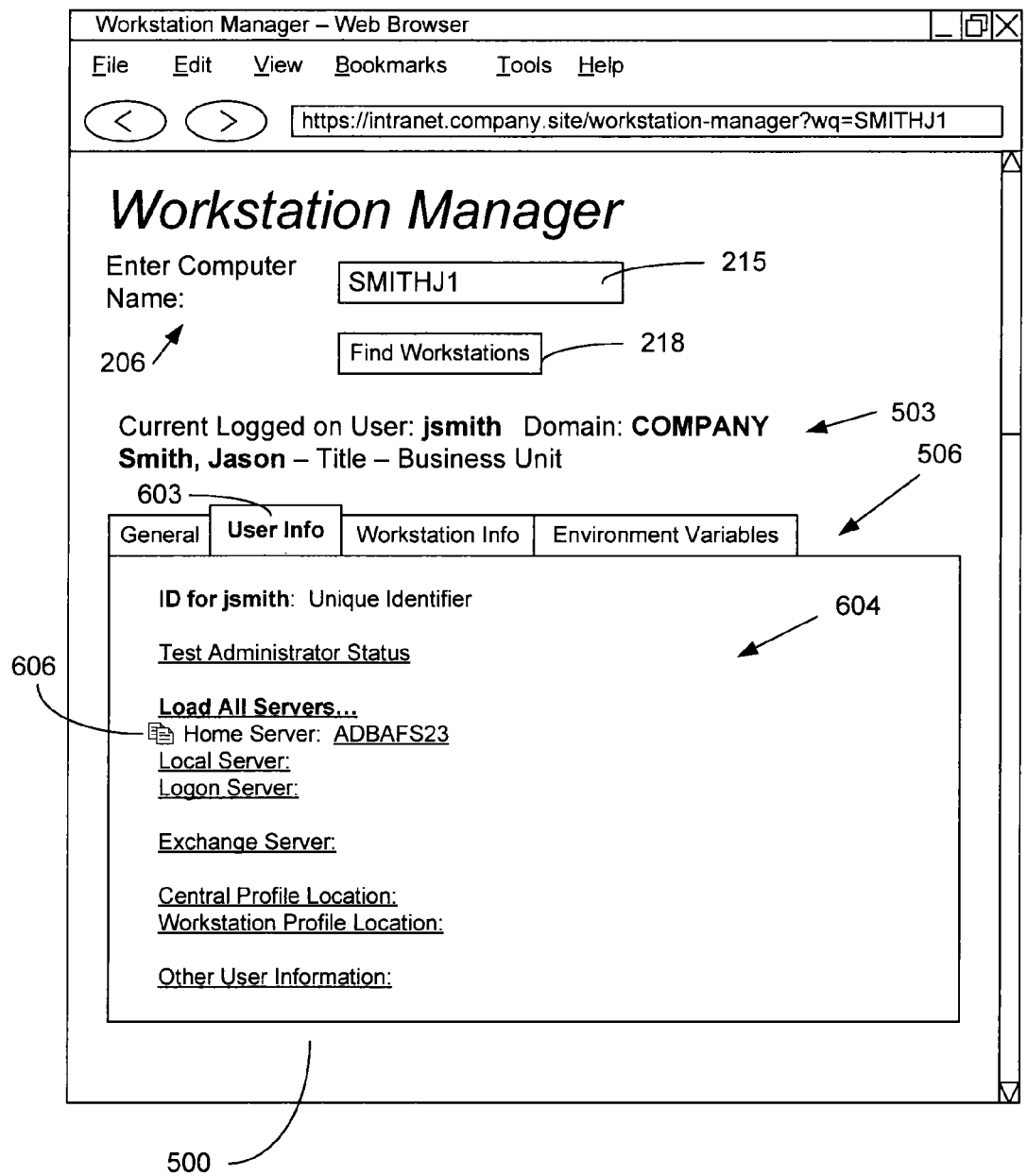

Referring next to FIG. 6, shown is another illustration of the user interface 500 of FIG. 5 rendered in the computing device 103 of the networked environment 100. In FIG. 6, a tab corresponding to a user info region 603 has been activated or selected. The user info region 603 provides various components 604 to obtain information about a current user of the workstation, including, for example, a unique identifier of the user, servers that are configured for the user, profile locations associated with the user, and/or other user information. The information may be displayed within the user info region 603 when the tab is selected or may be shown when separate links, buttons, or other user components are selected. Components, such as links, may be provided for browsing the file systems of any of the listed servers.

One or more copy components 606 may be provided in order to copy information from the user info region 603 to a system clipboard of the computing device 103. In one embodiment, a link, button, or other component may be provided for testing the administrator status of the user. When selected, the workstation management application 115 may verify the administrator status of the current user at the given workstation 106 by communicating with the given workstation 106 or another system that is capable of verifying the administrator status of the user. The workstation management application 115 may also provide the capability of adding or removing the user from the administrator group on that workstation 106.

Figure 7:
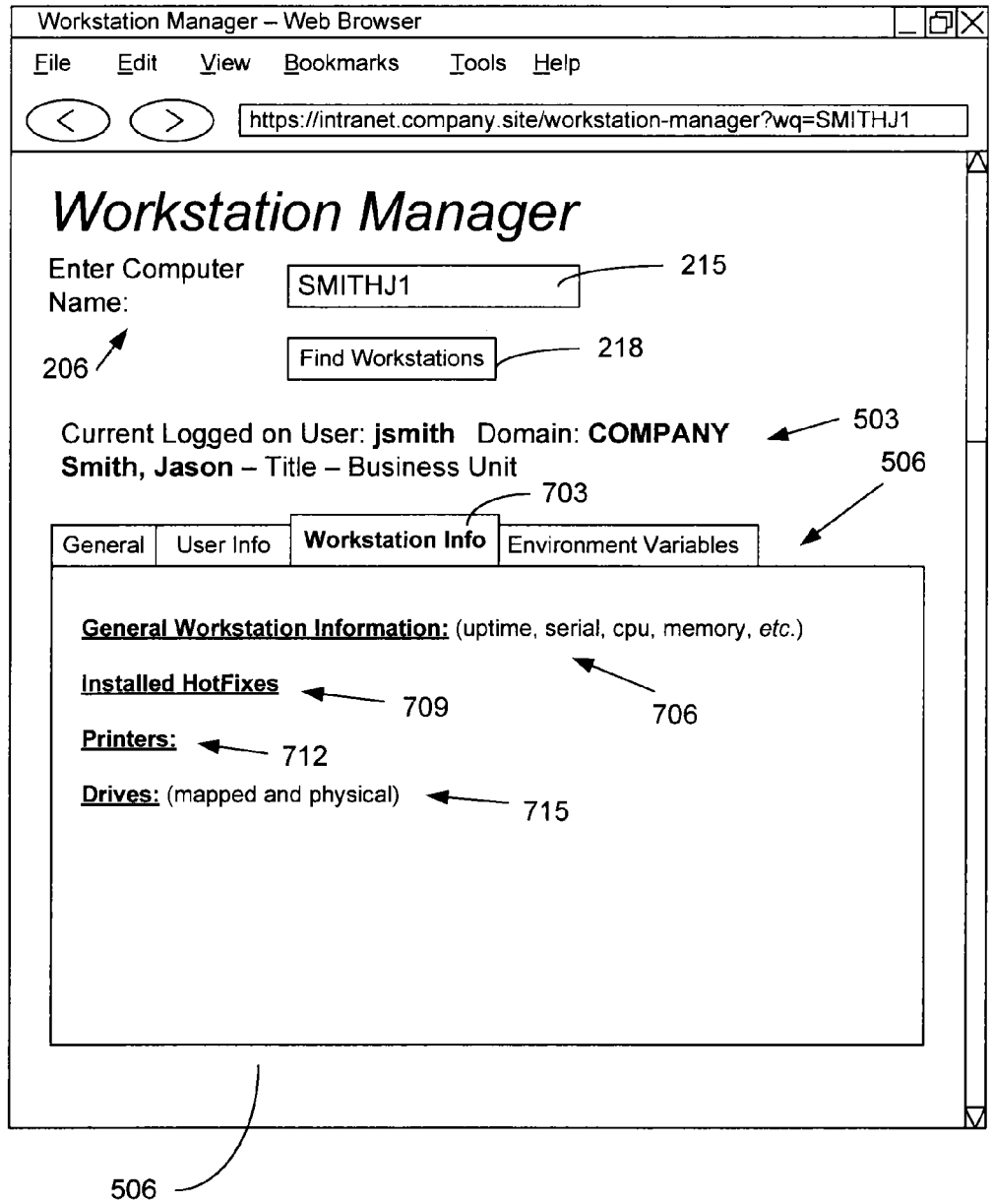

Referring next to FIG. 7, shown is another illustration of the user interface 500 of FIG. 5 rendered in the computing device 103 of the networked environment 100. In FIG. 7, a tab corresponding to a workstation info region 703 has been activated or selected. In the workstation info region 703, various components are provided for viewing information and/or managing aspects regarding the given workstation 106. To this end, in FIG. 7, the workstation info region 703 includes a general information component 706, an installed patches component 709, a printers component 712, and a drives component 715. Selection of any of the components in the workstation info region 703 may cause information to be shown within the workstation info region 703 in accordance with the component and/or may launch a separate display region, pop-up window, pop-over window, etc. The information may be obtained by the workstation management application 115 from the workstation data 127 in the respective workstation 106 and/or from other locations.

The general information component 706 may display various information about the workstation 106, including system uptime, serial number, processor type, memory size, etc. The installed patches component 709 may display a listing of patches or hotfixes that have been installed on the workstation 106. The installed patches component 709 may include a facility for allowing a management user to transfer a patch to the workstation 106 and install the patch on the workstation 106. The printers component 712 may provide a listing of printers that have been configured for the workstation 106. The printers component 712 may also provide a facility for configuring printers for use through the workstation 106. The drives component 715 may provide a facility for viewing file systems on various physical or mapped drives at the workstation 106. In addition, the drives component 715 may provide information about the various drives, such as capacity, usage, fragmentation status, error rate, specifications, etc.

Figure 8:
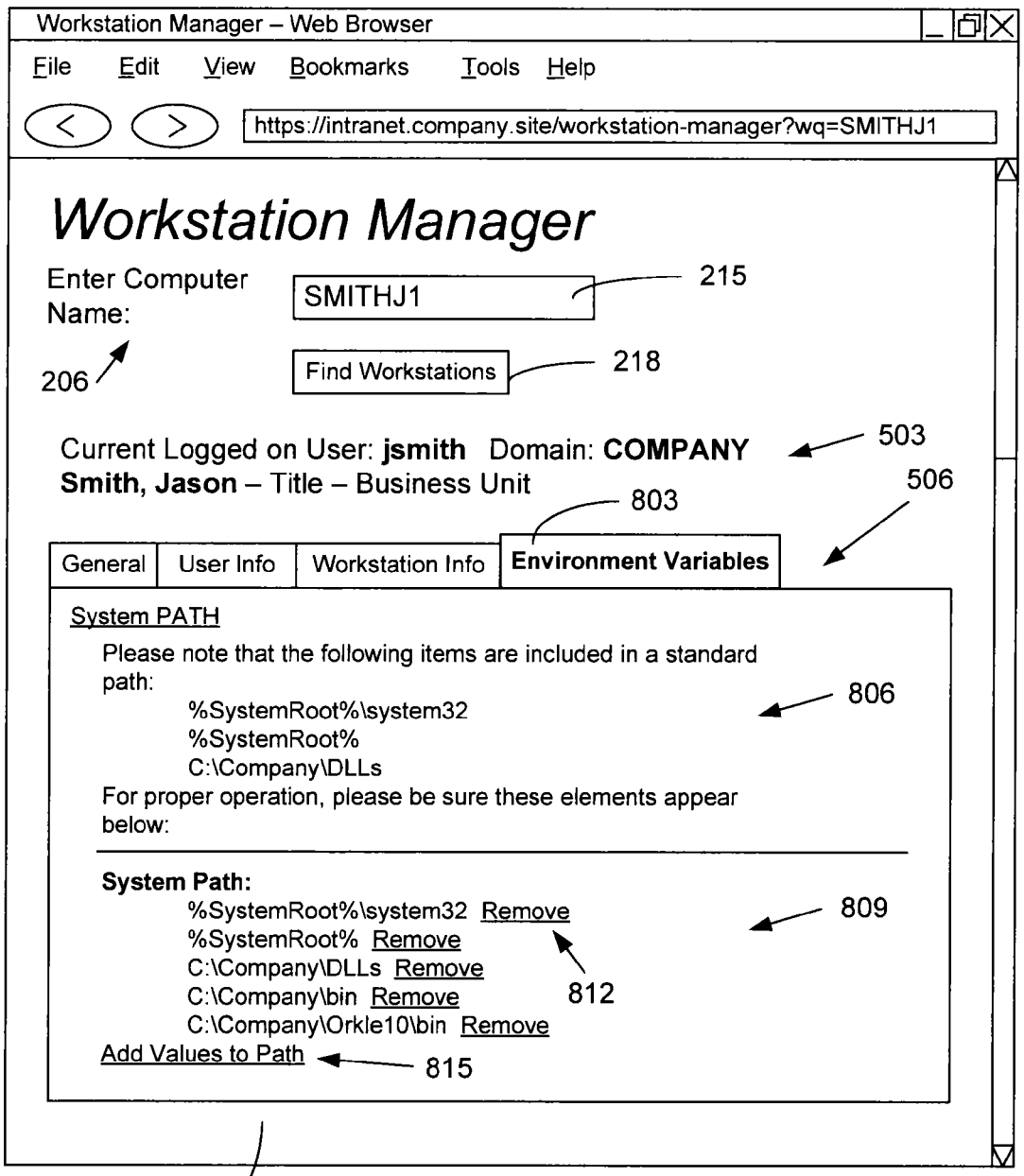

Referring next to FIG. 8, shown is another illustration of the user interface 500 of FIG. 5 rendered in the computing device 103 of the networked environment 100. In FIG. 8, a tab corresponding to an environment variables region 803 has been activated or selected. The environment variables region 803 provides for remote configuration of environment variables of the workstation 106. Examples of such environment variables may include path, localappdata, systemroot, temp, and other environment variables as configured for the operating system of the workstation 106. In the example of FIG. 8, the environment variables region 803 presents a facility for editing a system path.

The environment variables region 803 may include a description 806 for informing the management user of how to use the interface and how the path may be edited. The description 806 is, of course, optional and may be absent in some embodiments. The environment variables region 803 may include an editor interface 809 for editing an environment variable such as the system path. To this end, the entries of the current system path may be presented along with path entry remove components 812 for removing and/or editing the respective entries. The path entry remove components 812 may comprise links, buttons, checkboxes, radio buttons, and/or other user interface components. A path entry addition component 815 may be provided for adding entries to the path. It is understood that an environment variable may be edited in many different ways, for example, using a textarea or text field containing the entire variable, and the interface presented in FIG. 8 comprises merely one example.

Figure 9:
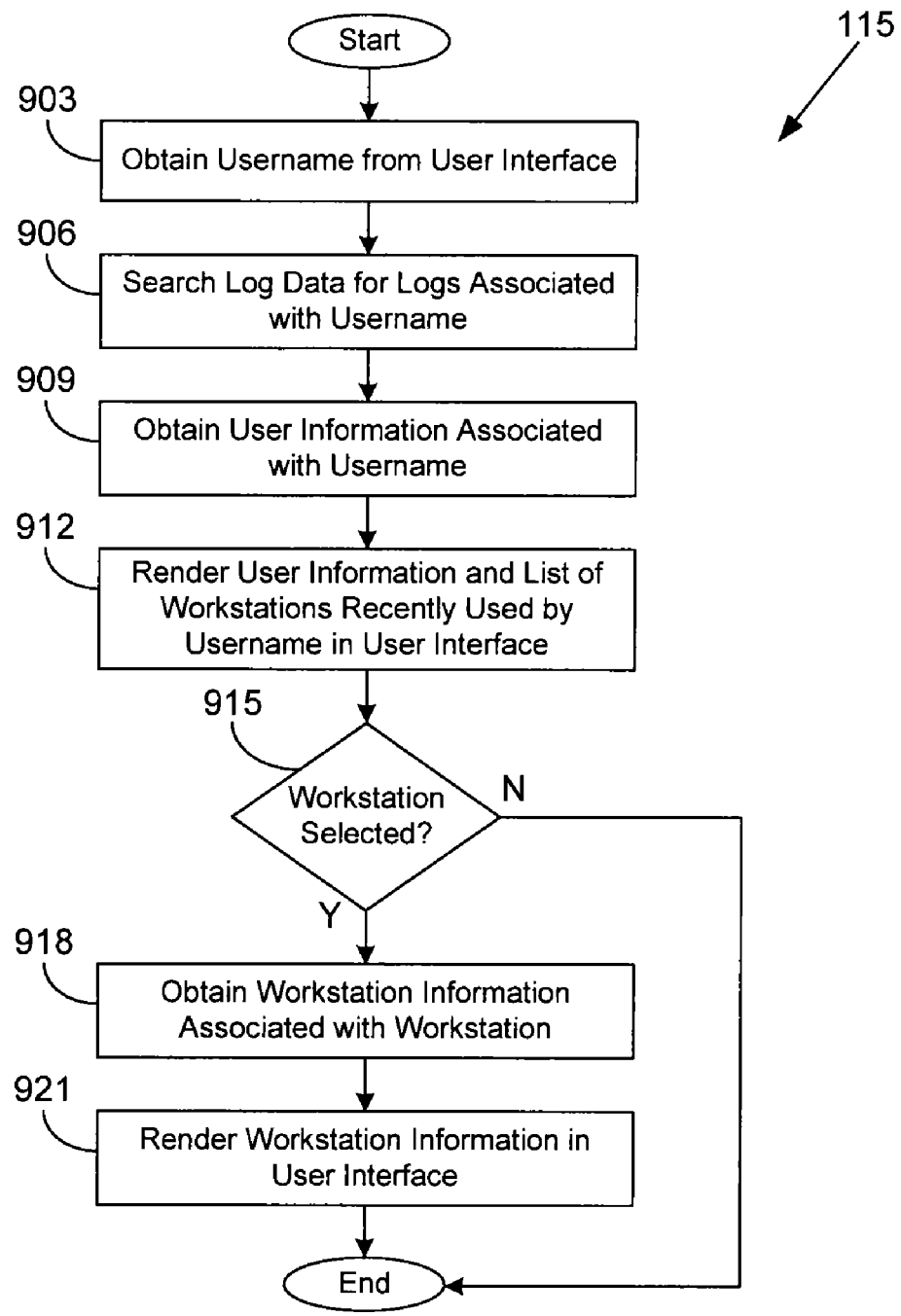
FIG. 9 is a flowchart illustrating one example of functionality implemented as portions of a workstation management application executed in a computing device in the networked environment of FIG. 1 according to various embodiments of the present disclosure.

Referring next to FIG. 9, shown is a flowchart that provides one example of the operation of a portion of the workstation management application 115 according to various embodiments. It is understood that the flowchart of FIG. 9 provides merely an example of the many different types of functional arrangements that may be employed to implement the operation of the portion of the workstation management application 115 as described herein. As an alternative, the flowchart of FIG. 9 may be viewed as depicting an example of steps of a method implemented in the computing device 103 (FIG. 1) according to one or more embodiments.

Beginning with box 903, the workstation management application 115 may obtain a username or another form of user identification from a management user at a user interface. In box 906, the workstation management application 115 searches the log data 124 (FIG. 1) for logs that are associated with the given username or user identification. In box 909, the workstation management application 115 obtains user information associated with the username or user identification from the user data 121 (FIG. 1).

Next, in box 912, the workstation management application 115 renders the user information and a list of workstations 106 (FIG. 1) recently used by the user in the user interface. In box 915, the workstation management application 115 determines whether a workstation 106 has been selected. If no workstation 106 has been selected, the portion of the workstation management application 115 then ends. If a workstation 106 has been selected, the workstation management application 115 moves to box 918 and obtains workstation information associated with the workstation 106. In box 921, the workstation management application 115 then renders the workstation information in the user interface. Thereafter, the portion of the workstation management application 115 ends.

Figure 10:
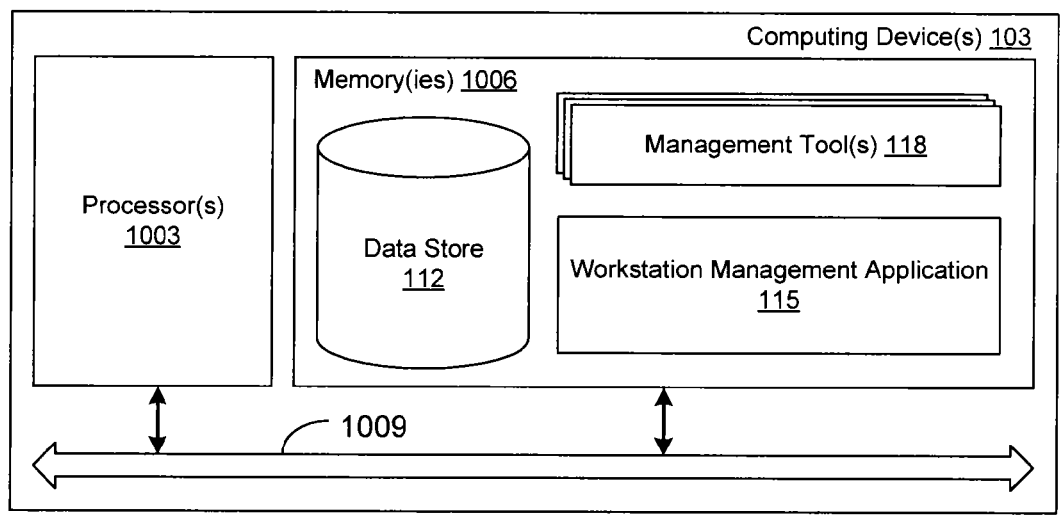
FIG. 10 is a schematic block diagram that provides one example illustration of a computing device employed in the networked environment of FIG. 1 according to various embodiments of the present disclosure.

With reference to FIG. 10, shown is a schematic block diagram of the computing device 103 according to an embodiment of the present disclosure. The computing device 103 includes at least one processor circuit, for example, having a processor 1003 and a memory 1006, both of which are coupled to a local interface 1009. To this end, the computing device 103 may comprise, for example, at least one server computer, client computer, or like device. The local interface 1009 may comprise, for example, a data bus with an accompanying address/control bus or other bus structure as can be appreciated.

Stored in the memory 1006 are both data and several components that are executable by the processor 1003. In particular, stored in the memory 1006 and executable by the processor 1003 are the workstation management application 115, management tools 118, a browser application, and potentially other applications. Also stored in the memory 1006 may be a data store 112 and other data. In addition, an operating system may be stored in the memory 1006 and executable by the processor 1003.

It is understood that there may be other applications that are stored in the memory 1006 and are executable by the processors 1003 as can be appreciated. Where any component discussed herein is implemented in the form of software, any one of a number of programming languages may be employed such as, for example, C, C++, C#, Objective C, Java, Javascript, Perl, PHP, Visual Basic, VBScript, Python, Ruby, Delphi, Flash, or other programming languages.

A number of software components are stored in the memory 1006 and are executable by the processor 1003. In this respect, the term "executable" means a program file that is in a form that can ultimately be run by the processor 1003. Examples of executable programs may be, for example, a compiled program that can be translated into machine code in a format that can be loaded into a random access portion of the memory 1006 and run by the processor 1003, source code that may be expressed in proper format such as object code that is capable of being loaded into a random access portion of the memory 1006 and executed by the processor 1003, or source code that may be interpreted by another executable program to generate instructions in a random access portion of the memory 1006 to be executed by the processor 1003, etc. An executable program may be stored in any portion or component of the memory 1006 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1006 is defined herein as including both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1003 may represent multiple processors 1003 and the memory 1006 may represent multiple memories 1006 that operate in parallel processing circuits, respectively. In such a case, the local interface 1009 may be an appropriate network 109 (FIG. 1) that facilitates communication between any two of the multiple processors 1003, between any processor 1003 and any of the memories 1006, or between any two of the memories 1006, etc. The local interface 1009 may comprise additional systems designed to coordinate this communication, including, for example, performing load balancing. The processor 1003 may be of electrical or of some other available construction.

Although the workstation management application 115, the management tools 118, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 9 shows the functionality and operation of an implementation of portions of the workstation management application 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1003 in a computer system or other system. The machine code may be converted from the source code, etc. If embodied in hardware, each block may represent a circuit or a number of interconnected circuits to implement the specified logical function(s).

Although the flowchart of FIG. 9 shows a specific order of execution, it is understood that the order of execution may differ from that which is depicted. For example, the order of execution of two or more blocks may be scrambled relative to the order shown. Also, two or more blocks shown in succession in FIG. 9 may be executed concurrently or with partial concurrence. Further, in some embodiments, one or more of the blocks shown in FIG. 9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the workstation management application 115 and the management tools 118, that comprises software or code can be embodied in any non-transitory computer-readable medium for use by or in connection with an instruction execution system such as, for example, a processor 1003 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:

code that obtains a username associated with a user account in a network page;

code that determines a plurality of workstations that the user account has logged into and logged out from based at least in part on a log file associated with the user account;

code that renders a listing of the workstations in the network page, the listing comprising a plurality of workstation entries, each workstation entry including an expand component, a workstation name, a logon event, and a time associated with the logon event; and code that renders additional information in the network page when the expand component of one of the workstation entries is selected, the additional information including a plurality of components for launching a plurality of management tasks associated with the corresponding one of the workstations.

2. The computer-readable medium of claim 1, wherein the additional information is rendered in an elastic display region of the network page between the corresponding one of the workstation entries and an adjacent one of the workstation entries.

3. The computer-readable medium of claim 1, wherein the program further comprises code that updates a detailed workstation information region in the network page for one of the workstations when the workstation name corresponding to the one of the workstations is selected.

4. The computer-readable medium of claim 3, wherein the detailed workstation information region includes at least one component for editing at least one system environment variable associated with the one of the workstations.

5. The computer-readable medium of claim 3, wherein the detailed workstation information region includes at least one component for editing at least one system environment variable associated with the one of the workstations.

6. The computer-readable medium of claim 3, wherein the detailed workstation information region includes at least one component for verifying an administrator status of a current user of the one of the workstations.

7. The computer-readable medium of claim 3, wherein the program further comprises code that obtains information from the one of the workstations.

8. A System, comprising:

at least one processor, and a workstation management application executable in the at least one processor, the workstation management application comprising:

logic that obtains an identification of a user interface;

logic that renders in the user interface a listing of workstations that the user has logged into and logged out from based at least in part on a log file associated with the user, the listing including, for each of the workstations, a respective expand component, a respective workstation name, a respective logon event, and a time associated with the respective logon event;

logic that obtains a selection of the respective expand component of one of the workstations in the user interface;

logic that renders in the user interface a listing of management tasks configured for the one of the workstations in response to the selection; and logic that launches one of the plurality of management tools to perform a selected one of the management tasks for the one of the workstations.

9. The system of claim 8, wherein the user interface comprises at least one network page.

10. The system of claim 8, wherein the logic that renders in the user interface the listing of workstations that the user has logged into further includes logic that renders in the user interface information relating to the user.

11. The system of claim 8, wherein the listing of workstations includes a copy component for each respective one of the workstations, each copy component being configured to copy information associated with the respective one of the workstations to a system clipboard of the at least one computing device when the copy component is selected by a management user.

12. The system of claim 8, wherein the listing of workstations includes at least one entry corresponding to the user logging into a workstation and at least one entry corresponding to the user logging out from the workstation.

13. The system of claim 8, wherein the one of the plurality of management tools comprises a file system browser configured to browse at least one file system of the one of the workstations.

14. The system of claim 8, wherein the one of the plurality of management tools comprises a remote registry editor configured to edit a system registry of the one of the workstations.

15. The system of claim 8, wherein the one of the plurality of management tools comprises a remote assistance application configured to enable a management user to provide remote assistance to a current user of the one of the workstations.

16. The system of claim 8, wherein the listing of workstations comprises a listing of a proper subset of a plurality of workstations that the user has logged into.

17. The system of claim 8, wherein the respective expand component corresponds to a selectable workstation identification in the listing of workstations.

18. The system of claim 8, wherein another selection of the one of the workstations is obtained when a management user inputs a name associated with the one of the workstations.

19. The system of claim 8, wherein the workstation management application further comprises:

logic that executes a network performance measurement for the one of the workstations in response to obtaining the selection of the one of the workstations; and logic that renders a result of the network performance measurement in the user interface in association with the listing of management tasks.

20. A method, comprising the steps of:

obtaining, in at least one computing device comprising at least one processor, an identification of a user account from a form embedded in a network page;

determining, in the at least one computing device, a plurality of workstations that the user account has logged into and logged out from based at least in part on a log file associated with the user account;

displaying, in the at least one computing device, a list of workstation accesses in the network page, each of the workstation accesses including a respective expand component, a respective workstation name, a respective logon event associated with the user account, and a time associated with the respective logon event;

obtaining, in the at least one computing device, a selection of one of the workstations from a component in the network page that corresponds to the respective expand component of the one of the workstations;

obtaining, in the at least one computing device, data from the one of the workstations; and displaying, in the at least one computing device, a management menu configured for the one of the workstations in the network page in response to the selection, the management menu indicating a status associated with the one of the workstations based at least in part on the data, the management menu including a plurality of components for launching a plurality of management tools for remotely managing the one of the workstations.

21. The method of claim 20, further comprising the step of copying, in the at least one computing device, information related to the one of the workstations to a system clipboard when a copy button associated with the one of the workstations is selected.

* * * * *